United States Patent [19]

Miller

[11] Patent Number: 5,553,382
[45] Date of Patent: Sep. 10, 1996

[54] METHOD FOR PRODUCING A SHAFT CLUTCH COMPONENT

[75] Inventor: James R. Miller, Yakima, Wash.

[73] Assignee: Manhasset Specialty Co., Yakima, Wash.

[21] Appl. No.: 310,860

[22] Filed: Sep. 22, 1994

Related U.S. Application Data

[62] Division of Ser. No. 850,662, Mar. 3, 1992, Pat. No. 5,375,445.

[51] Int. Cl.⁶ ..................................................... B23P 11/00
[52] U.S. Cl. .......................... 29/896.9; 29/434; 267/163
[58] Field of Search ............................... 29/173, 428, 434, 29/896.9; 267/161, 163, 158, 181; 248/188.5, 449, 461

[56] References Cited

U.S. PATENT DOCUMENTS

| | | | |
|---|---|---|---|
| 2,009,496 | 7/1935 | Johnson | 267/181 |
| 2,429,863 | 10/1947 | Wright | 267/181 |
| 2,762,119 | 9/1956 | Jackson . | |
| 2,968,974 | 1/1961 | Everett . | |
| 3,722,053 | 3/1973 | Berry | 29/173 |
| 4,313,331 | 2/1982 | Mode | 72/368 |
| 4,542,852 | 9/1985 | Orth | 267/161 |
| 4,773,284 | 9/1988 | Archer | 72/307 |

FOREIGN PATENT DOCUMENTS

| | | | |
|---|---|---|---|
| 717865 | 2/1932 | France | 248/188.5 |
| 65157 | 8/1913 | Germany | 248/188.5 |
| 345827 | 12/1921 | Germany | 248/188.5 |
| 63-09703 | 12/1988 | Japan . | |

*Primary Examiner*—Daniel C. Crane
*Attorney, Agent, or Firm*—Stratton Ballew PLLC

[57] ABSTRACT

A shaft clutch mechanism, and method and apparatus for its production are disclosed. The shaft clutch mechanism has an upper body folded into a polygonal cross section with a plurality of fingers, each finger attached to and extending from a flat section of the upper body. The shaft clutch mechanism is pressed on to one end of an inner nested element of a telescoping body and is placed inside an outer element where the fingers are slightly deformed, providing slight friction sufficient to hold the inner element in place, but still allowing it to slide relative to the outer element. The method and apparatus for producing the shaft clutch mechanism use a two stage press and a bending device to take a continuous strip of material to form blanks which then are bent to form the shaft clutch mechanism that is pressed on to the inner element of the telescoping body.

5 Claims, 6 Drawing Sheets

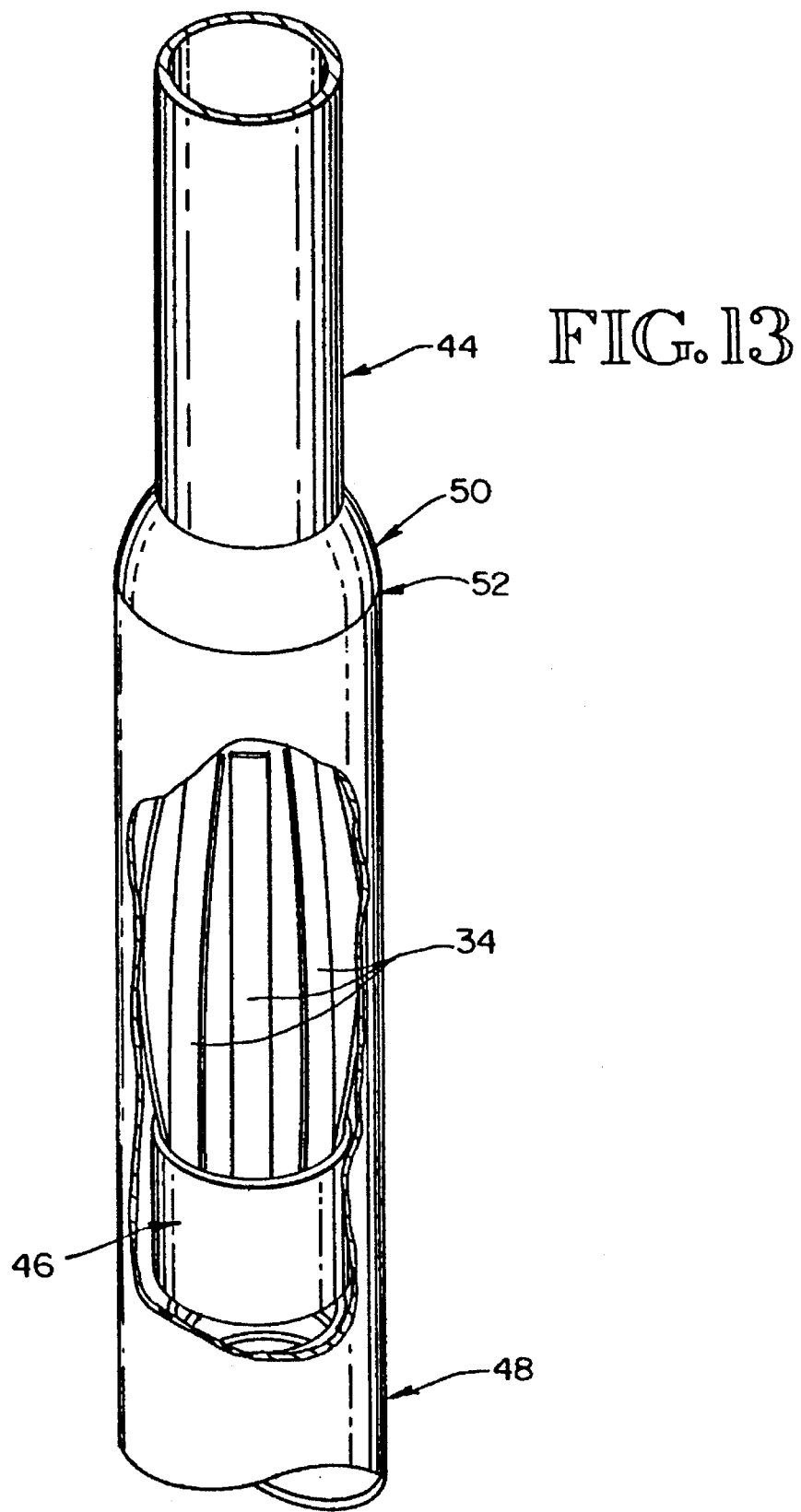

5,553,382

METHOD FOR PRODUCING A SHAFT CLUTCH COMPONENT

RELATED APPLICATIONS

This application is a divisional application of U.S. application Ser. No. 07/850,662, filed Mar. 3, 1992 now U.S. pat. No. 5,375,445.

TECHNICAL FIELD

The present invention relates to a shaft clutch mechanism, and method and apparatus for its production. More particularly, both the mechanism, and method and apparatus for its production relate to a clutch which allows relative movement between two elements in a telescoping body where one element is nested inside the second element and adjustment to relative position is required, and yet the mechanism holds the two elements stationary relative to each other after the desired adjustment is made.

BACKGROUND OF THE INVENTION

The use of telescoping bodies which have nested elements to make an object more compact is well known, and has been practiced for a long time. One of the problems presented by any sort of telescoping body using nested elements is in controlling movement of the elements relative to one another. This can be a particularly vexing problem when the telescoping body is load-bearing, such as the support member for a music stand.

In a music stand there is typically a support member comprised of an outer tube, and an inner tube which is slidably mounted within the outer tube. This support member is vertically oriented, with the music holder mounted on top of the upper end of the inner tube. The weight of the music holder and any music placed on the music holder presents a problem, given the telescopic nature of the music stand. It is important that the height of the music stand be easily adjustable, but it is equally important that the adjustment be retained and that the inner tube of the music stand remain stationary relative to the outer tube of the music stand when adjustments are completed and the stand is in use.

Attempts to achieve the desired adjustment with music stands is illustrative of attempts to achieve adjustments with telescoping bodies in general. The simplest and most straight forward way of achieving this adjustment is to crimp the upper end of the outer tube against the inner tube body, using the friction from the outer tube upper end to hold the inner tube stationary, while allowing it to be adjustable. This method has a number of limitations, including the fact that it requires a very precise fit with the inner and outer tubes, especially at the crimp of the outer tube upper end. As the stand is repeatedly used, excessive wear to both the inner tube body and the crimped outer tube upper end causes the stand to fail to hold its adjustment.

Another mechanism used to adjust music stands is one which adds a threaded collar to the outer tube and causes the tightening of some portion of the outer tube upper end, or a contained gasket or "O" ring, against the inner tube body, thereby holding it in place once the adjustment is made. This mechanism and its production adds costs to the music stand, and is less convenient to use when adjusting the music stand, requiring the loosening and tightening of the threaded cap. Also, if the mechanism uses gaskets they can be worn and have to be replaced.

Several adjustment mechanisms have been tried using a spring mounted internally in the overlapping space between the inner and outer tubes. While these mechanisms represent some difficulty in increased cost in manufacturing, some success has been achieved. One mechanism that achieved a great deal of success was a clutch device which used a plurality of fingers arranged substantially uniformly about the inner tube proximate the inner tube lower end. These fingers were held in place by a collar which fit around the inner tube lower end and has one end of each of the fingers held between it and the inner tube. The fingers themselves were bowed outward from the inner tube so they are pressed against the outer tube. This adjustment mechanism allows the inner tube to be moved up and down by simply grasping the upper end of the inner tube or a music desk attached to the upper end of the inner tube and lifting up or pushing down. At the same time the plurality of fingers constituting the clutch provided sufficient friction to prevent the inner tube from sliding downward even when the music was on the music desk.

The above described mechanism, however, was relatively expensive to produce in that its production was relatively labor intensive. Individual fingers had to be produced and then manually inserted into the jig which held them in their arrayed position. The inner tube lower end was placed in the middle of fingers then pressed down so that it was inserted between the fingers lower end and the outer collar. Thus, this mechanism required separate production of fingers and collars and further assembly by hand, which made it relatively expensive to produce. At the same time, it proved to be a generally superior mechanism for achieving the desired combination of ease of adjustment and ability to hold the adjustment once the desired adjustment was achieved.

As illustrated by the above discussion, there are a number of desirable features for a shaft clutch mechanism and method for its production. It would be desirable for a shaft clutch mechanism to allow easy adjustment of a telescopic body utilizing nested elements, and at the same time allowing the adjustment to be retained once achieved. It also would be desirable for a shaft clutch mechanism to have a plurality of fingers arrayed about an inner nested element of a telescopic body. It further would be desirable to have a shaft clutch mechanism which had a plurality of fingers arrayed about an inner nested body with the shaft clutch mechanism being constructed from a single piece of material. Additionally, it would be desirable to have a shaft clutch mechanism produced by a fully or partially automated method and apparatus.

While the discussion herein relates to shaft clutch mechanisms for telescoping bodies such as music stands, and methods and apparatuses for their production, it is not intended that the invention be limited to this situation. It will be obvious from the description that follows that the present invention will be useful in other applications with problems common to those described herein.

DISCLOSURE OF THE INVENTION

It is the object of the present invention to provide a shaft clutch mechanism which will allow the nested elements of a telescoping body to be adjusted relative to one another easily while at the same time retaining the desired adjustment once it has been made.

It is a further object of the present invention to provide a shaft clutch mechanism which has a plurality of fingers arrayed about an inner nested element of a telescoping body with the fingers also providing frictional force against the outer element of the telescoping body.

It is an additional object of the present invention to provide a shaft clutch mechanism with a plurality of fingers where the shaft clutch mechanism is produced from a single piece of material.

It is also the object of the present invention to provide a method for producing a shaft clutch mechanism with a plurality of fingers from a single piece of material.

It is yet another object of the present invention to provide a method of automating the production of shaft clutch mechanisms with a plurality of finger produced from a single piece of material.

It is an additional object of the present invention to provide an apparatus for producing the shaft clutch mechanisms with a plurality of finger produced from a single piece of material using the automated methods of production.

It is also an object of the present invention to provide a method for producing a shaft clutch mechanism with a single piece of material which minimizes "spring back" as the shaft clutch mechanism is produced.

The present invention achieves these and other objectives which will become apparent from the description that follows by providing a shaft clutch mechanism which has a plurality of bowed fingers arrayed about an inner nested element of a telescoping body with the shaft clutch mechanism being produced from a single piece of material.

In a preferred embodiment of the present invention, the shaft clutch mechanism has an upper body with a polygonal cross section. Attached to the upper body and arrayed about it are a plurality of fingers. The fingers are bowed outward so that when the shaft clutch mechanism is mounted on the inner nested element, the fingers will contact the outer element.

A shaft clutch mechanism identical to the one discussed above can be mounted to one end of an inner nested element of a telescoping body with a retaining ring holding it in place about the end of the nested element. The fit of the retaining ring forces the end of the inner nested element to take the polygonal shape of the shaft clutch mechanism cross section.

A preferred method for producing the shaft clutch mechanisms includes the steps of creating a blank from a single piece of material with the fingers formed, bending the fingers, and then forming the polygonal cross section by bending the upper body.

An preferred method discussed above is performed with the additional steps of taking the blank and bending the upper body along its width at each gap between the fingers. The bends are made one at a time with each fold being "over bent" to minimize spring back.

In a further alternative preferred embodiment of the present invention, an apparatus for creating the shaft clutch mechanisms in accordance with the methods discussed above is provided. The device has a two stage press for forming and bending the blanks, and a bending device which takes the blanks and bends the upper bodies one gap at a time to create the polygonal cross section. The finished shaft clutch mechanism is then ejected.

In another preferred embodiment of the present invention, the bending device uses a rolling key and mandrel with a polygonal side to bend the body.

In an additional preferred embodiment of the present invention, a programmable controller is used to control the production of the shaft clutch mechanisms.

BRIEF DESCRIPTION OF THE DRAWINGS

FIG. 13 is a partial perspective view of the present invention in a fully assembled configuration with portions cut away to illustrate the installation of the invention.

DETAILED DESCRIPTION OF PREFERRED EMBODIMENTS

Figure 1:
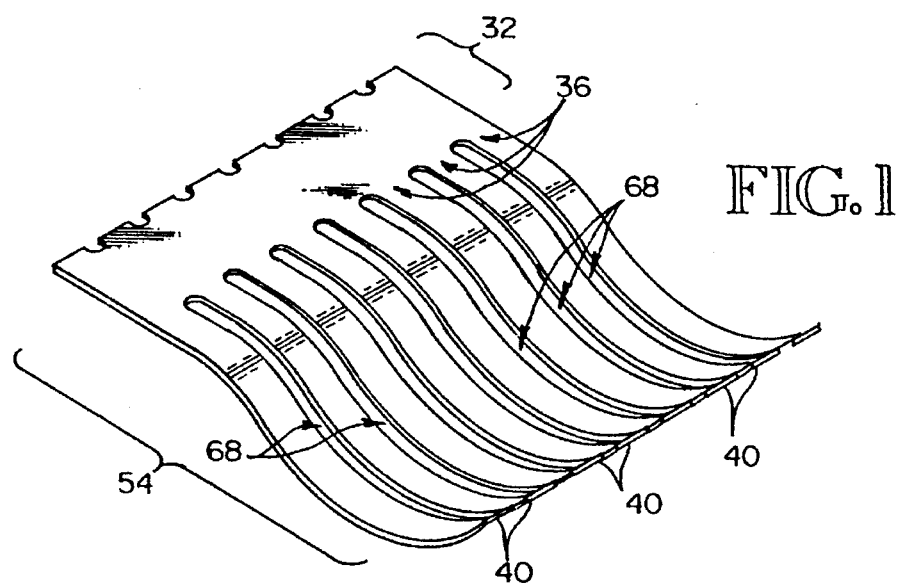
FIG. 1 is a perspective view of a preferred embodiment of a shaft clutch blank constructed in accordance with the present invention.

With reference to FIGS. 1, 10, 11 and 13, a shaft clutch mechanism 30 is shown. The shaft clutch mechanism has upper body 32 and a plurality of fingers 34 attached to the upper body. The upper body is bent into a polygonal shape with a finger first end 36 attached to each fiat section 38 of the upper body. The fingers are bowed outward along their length with the finger second ends 40 returning inward to lay in substantially the same plane as the corresponding upper body section.

Figure 11:
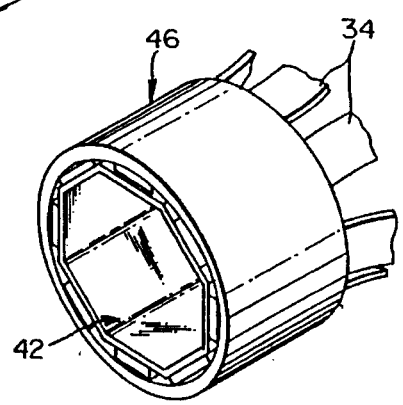
FIG. 11 is an enlarged partial view of the invention as shown in FIG. 10.

The shaft clutch mechanism 30 is mounted proximate a first end 42 of an inner tube 44 with a retaining ring 46. The retaining ring fits around the mechanism upper body 32 and the inner tube first end. As best illustrated in FIG. 11, the retaining ring fits sufficiently tight about the mechanism upper body and the inner tube first end that inner tube first end is deformed from a substantially circular shape to the polygonal shape of the mechanism upper body.

When the music stand is assembled as best seen in FIG. 13, a variable portion of the inner tube 44 and the inner tube first end 42, together with the attached shaft clutch mechanism 30, are located within an outer tube 48. A seal 50 at the first end 52 of the outer tube fits closely, but slidably around the inner tube. Inside the outer tube, the mechanism fingers 34 are partially compressed by outer tube, as shown in FIG. 13, while retaining a slidable fit. The friction from the fingers pushing outward against the outer tube is sufficient to hold the inner tube in place relative to the outer tube while allowing easy movement of the inner tube relative to the outer tube.

Figure 2:
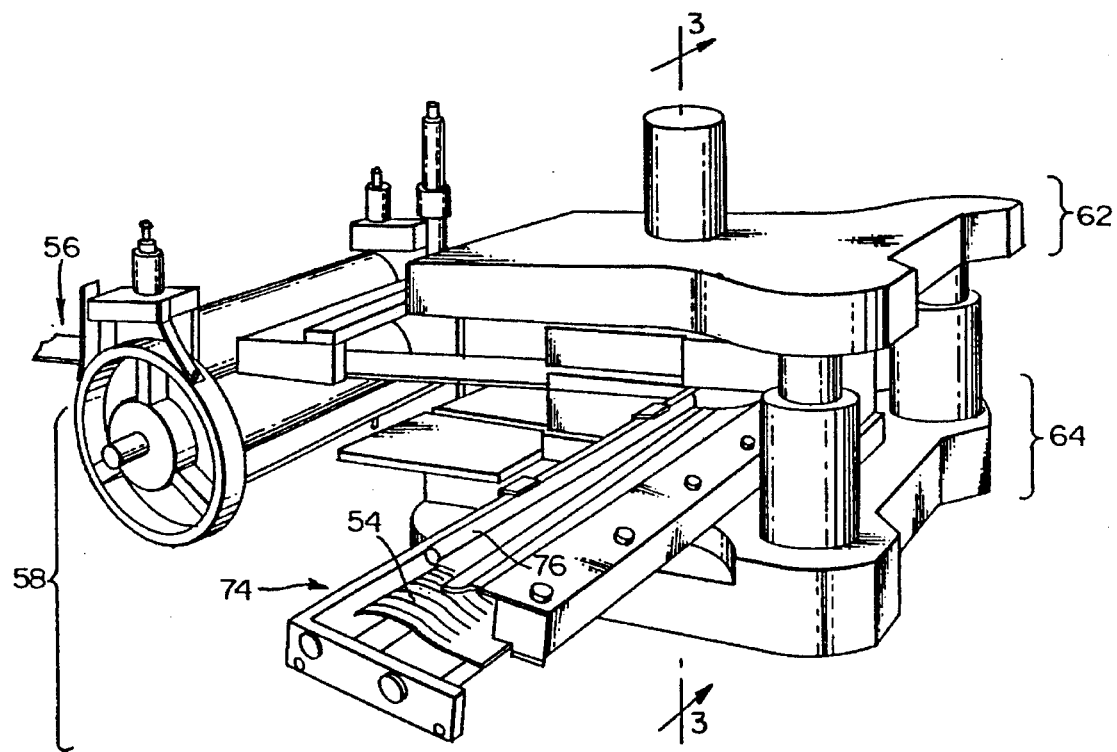
FIG. 2 is a perspective view of a two stage press for forming blanks shown in FIG. 1.
Figure 3:
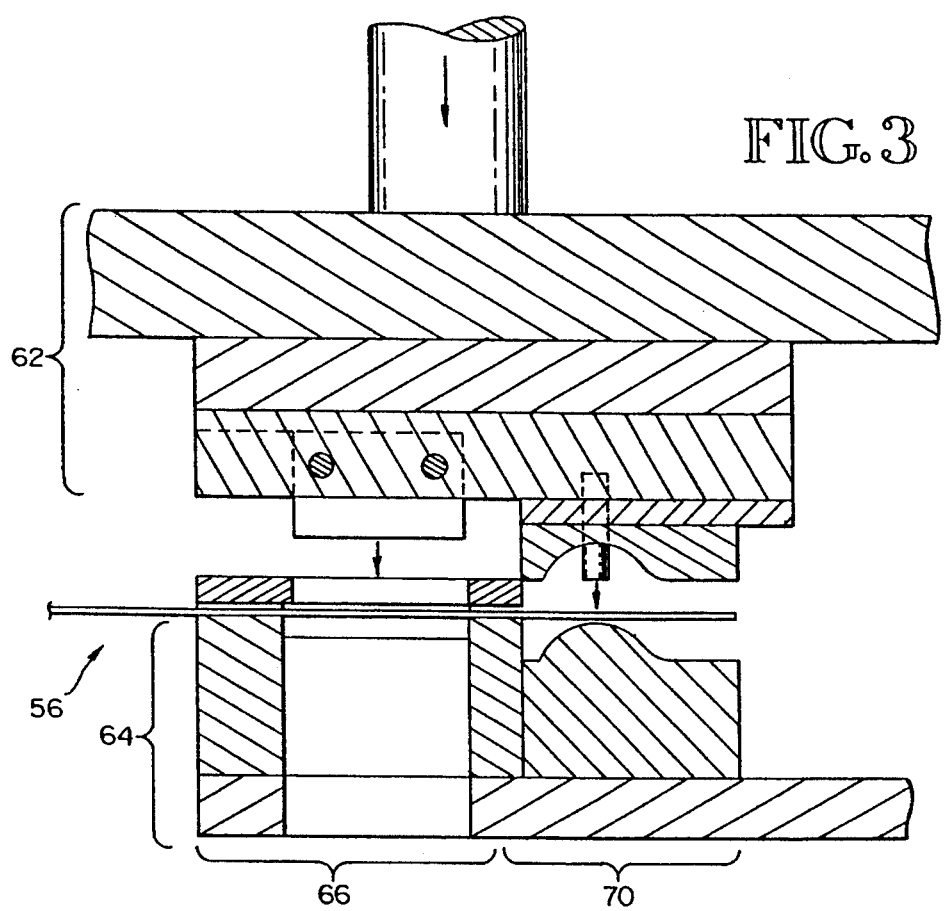
FIG. 3 is a side cross section view of the two stage press in an open position illustrated in FIG. 2, taken along lines 3—3.

To create the shaft clutch mechanism 30, a blank 54 which is substantially flat along its width and curved for at least a portion of its length, as illustrated in FIG. 1, must be created. To make the blank, a continuous strip of material 56 is fed into a two-stage press 58 shown in FIG. 2. The two-stage press has an upper portion 62 which moves up and down, and a lower portion 64 which is stationary. The upper portion is in its "up" position, the continuous strip of material is advanced through the two-stage press. The first stage of the two-stage press is a punch 66 shown in FIGS. 3 and 4. This punch, when lowered on the continuous strip which cuts out or punches a plurality of elongated slots along the length of the strip of the continuous material. These slots are substantially aligned and of equal length. These slots will form the gaps 68 between the fingers on the finished shaft clutch mechanism.

Figure 4:
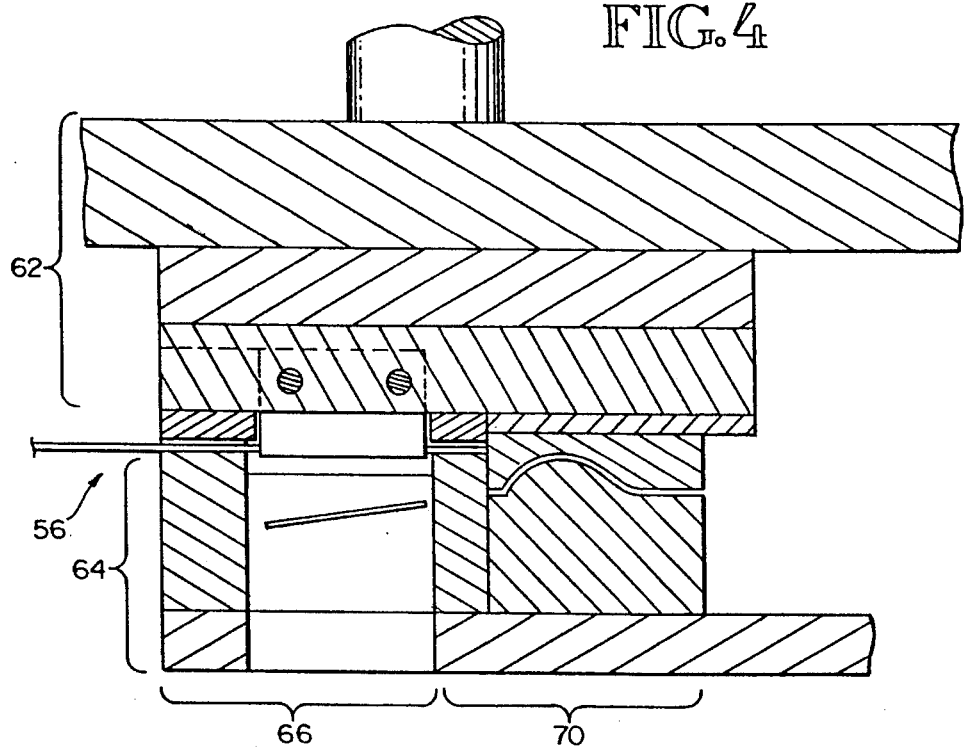
FIG. 4 is a side cross section view of the alternative preferred embodiment illustrated in FIG. 2, taken along lines 4—4.

The second stage of the press 58 is a curved press 70. The curved press serves two functions. When the upper portion 62 of the two-stage press 58 is lowered, the curved press cuts the blank from the continuous strip at one end of the plurality of elongated slots to form the blanks. The material 56 is then advanced (as has been shown in FIG. 2) so that the curved press bends the blank along its length, as illustrated in FIG. 4, to form the curved portion 72 of the blank. When the upper portion of the two-stage press is raised, the curved cut blank is pushed along a slide 74 by an ejector 76 shown in FIG. 1. When the blank reaches the end of the slide, it is allowed to fall in a collection box (not shown).

An operation, the upper portion 62 of the two-stage press 58 lifts up. While the upper portion is in its up position, the finished blank 54 is pushed along the slide 74 by the ejector 76. The continuous strip is then advanced so that the portion of the continuous strip with elongated slots cut into it is advanced to the curved press, while a completely new portion of the continuous strip is advanced into the punch portion of the two-stage press.

A number of materials can be used to form the blanks which create the shaft clutch mechanism. In applications in which the shaft clutch mechanism is to be used with chrome plated steel, a very common application in things like music stands, batons, etc., success has been achieved using brass or phosphor bronze. The size of the telescoping body with which the shaft clutch mechanism is to be used dictates the size of the material used to create the blank and subsequent shaft clutch mechanism. In use with music stands, it has been found that coiled strips of continuous material 2 to 2½ inches (5.08 to 6.35 cm) wide have worked quite well.

After the blank has been created and is ejected from the two-stage press, it is stacked by any number of methods, either collecting in boxes, or by the use of boxes on a conveyor. Success has been achieved using a rotating carousel which delivers the ejected blank to a rotating carousel from which the ejected blank falls. The rotating carousel rotates until the blank hits a slide, which allows the blank to pass from the carousel down the slide into a stacking bin.

Figure 5:
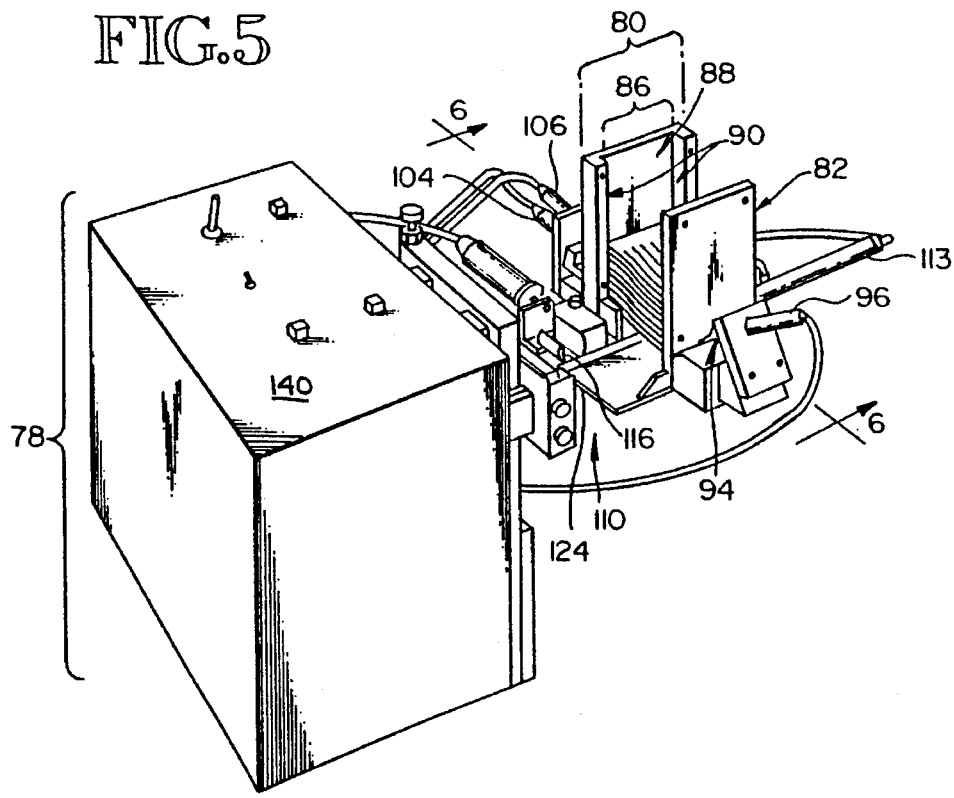
FIG. 5 is a perspective view of a bending device preferred in accordance with the present invention.
Figure 6:
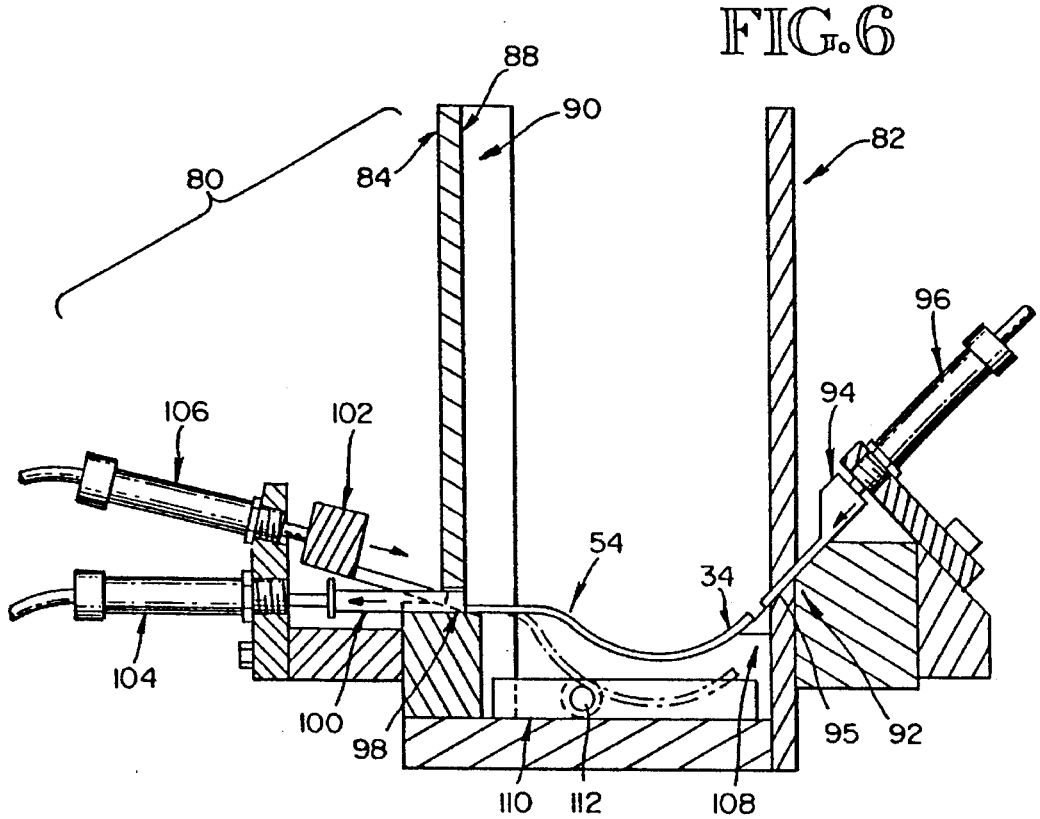
FIG. 6 is a side cross section view of the bending device illustrated in FIG. 5, taken along lines 6—6.
Figure 7:
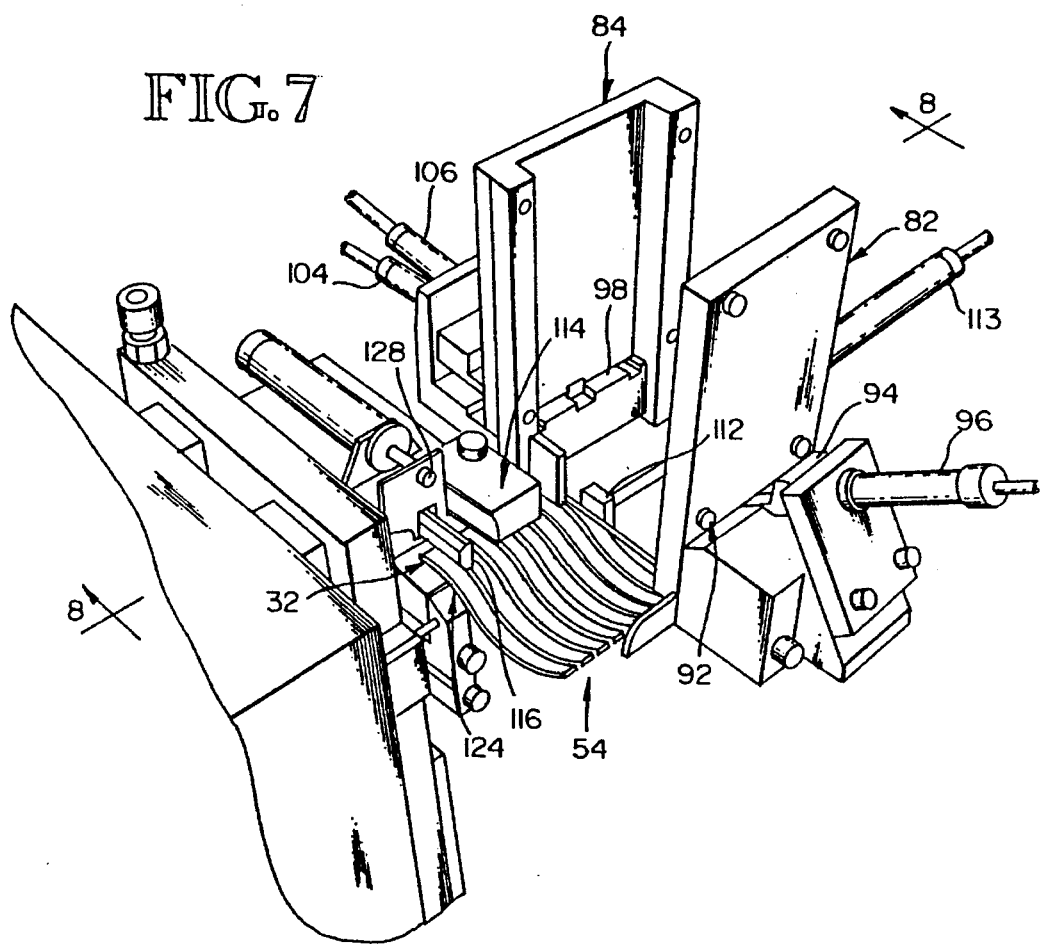
FIG. 7 is a partial perspective view of the operation of the bending device illustrated in FIG. 5.

After the finished, ejected blanks have been collected and stacked, they are delivered to the bending device 78 which is illustrated in FIGS. 5 through 7. The finished blanks 54 are placed into a feeding mechanism 80 of the bending device 78. The feeding mechanism serves to isolate a single blank 54 for a substitute bending operation to be described hereinbelow. The blanks can be fit automatically or stacked manually. The feeding mechanism has a forward wall 82 and a rearward wall 84. These walls are vertically oriented and substantially aligned. The rearward wall contains a channel 86 with a bottom 88 and sides 90. The distance between the forward wall and the channel bottom is substantially equal to the length of the finished blank. The distance between the channel sides is substantially equal to the width of the finished blank. As shown in FIG. 5, finished blanks are stacked in the feeding mechanism with the upper body 32 located in the rearward wall channel and the fingers 34 oriented towards the forward wall 82.

A compression slot 92 is located in the lower portion of the forward wall 82. The slot passes completely through the forward wall. Mounted outside the forward wall is a compression fork 94 which can pass through the compression slot into the feeding mechanism. A motive cylinder 96 powers the compression fork, which moves backwards and forwards. Located in the rearward wall 84 is a release slot 98. Mounted outside the rearward wall is a block gate 100 and a release fork 102. Attached to the block gate is a block gate motive cylinder 104. Attached to the release fork is release fork motive cylinder 106. As with the compression fork, the motive cylinders for the block gate and the release fork move them in and out through the release slot.

In operation, the feeding mechanism 80 supplies one blank 54 at a time. The lowest blank in the stack in the feeding mechanism as shown in FIG. 6 rests upon an internal projection 108. First the block gate 100 is moved forward to close the release slot 98 proximate the upper body 32 of the blank. Next, the compression fork 94 is moved forward so that its fingers 95 press against the fingers 34 of the blank. This causes the blank to bow in its curved section so that it no longer rests upon the internal projection. The block gate is then moved backwards to allow the upper body to slide into the release gate. This results in the release of the blank fingers from the compression fork, which allows that end of the blank to drop down. With the block gate still pulled away from the release slot, the release fork is then moved forward to push the upper body out of the release slot allowing the entire blank to fall on the slide tray 110. The orientation of the compression fork, the release fork, and the block gate are dictated by the size and the amount of curvature in the blank. They are also adjusted so that only one blank is affected at a time. After the blank has dropped to the slide tray, both the compression fork and the release fork are moved backwards, and the block gate is moved forward to once again block the release slot in anticipation of the next blank being run through the feeding mechanism 80.

Once a single blank has been isolated by the feeding mechanism and is on the sliding tray, a push pad 112 moves to push the blank sideways along the sliding tray. The blank slides through a space created at first between the sliding tray and a retaining block 114 located above the sliding tray as best seen in FIG. 7. After the blank has passed between the retaining block and the sliding tray it passes under a mandrel 116 which extends out over the sliding tray. This mandrel has a flat side 118 and a polygonal side with multiple flat sections 122. The push pad advances the blank until it reaches a stop 124, at which time the push pad motive cylinder 113 relaxes the push pad pressure against the blank.

Figure 8:
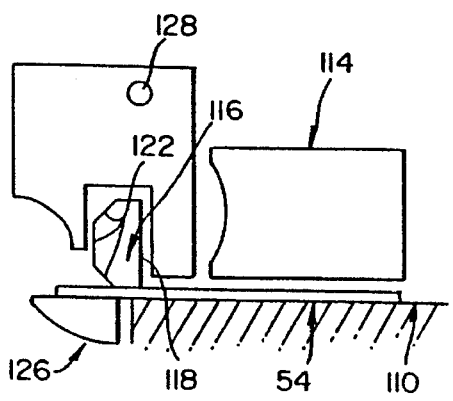
FIG. 8 is a side cross section view of the bending device illustrated in FIG. 7, taken along lines 8—8.
Figure 9:
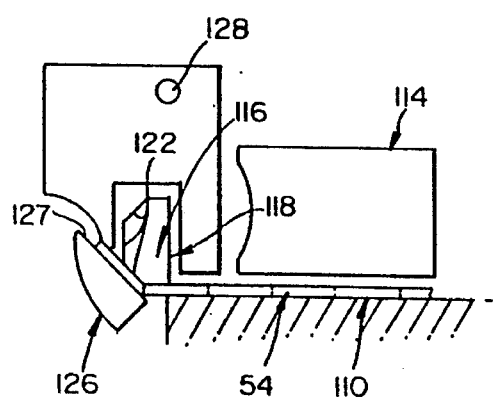
FIG. 9 is a side cross section view of the bending device illustrated in FIG. 7, in a second stage taken along lines 9—9.

When the blank is resting against the stop, it extends past the end of the sliding tray over a rolling key 126 which projects outward substantially under the mandrel. The location of the blank relative to the mandrel, sliding tray, and rolling key is best illustrated in FIG. 8. After the push pad has relaxed, the rolling key rotates upward, folding and permanently creasing the upper body between the flat upper surface 127 of the rolling key and one of the flat sections 122 of the polygonal side of the mandrel 116, as shown in FIG.

Figure 10:
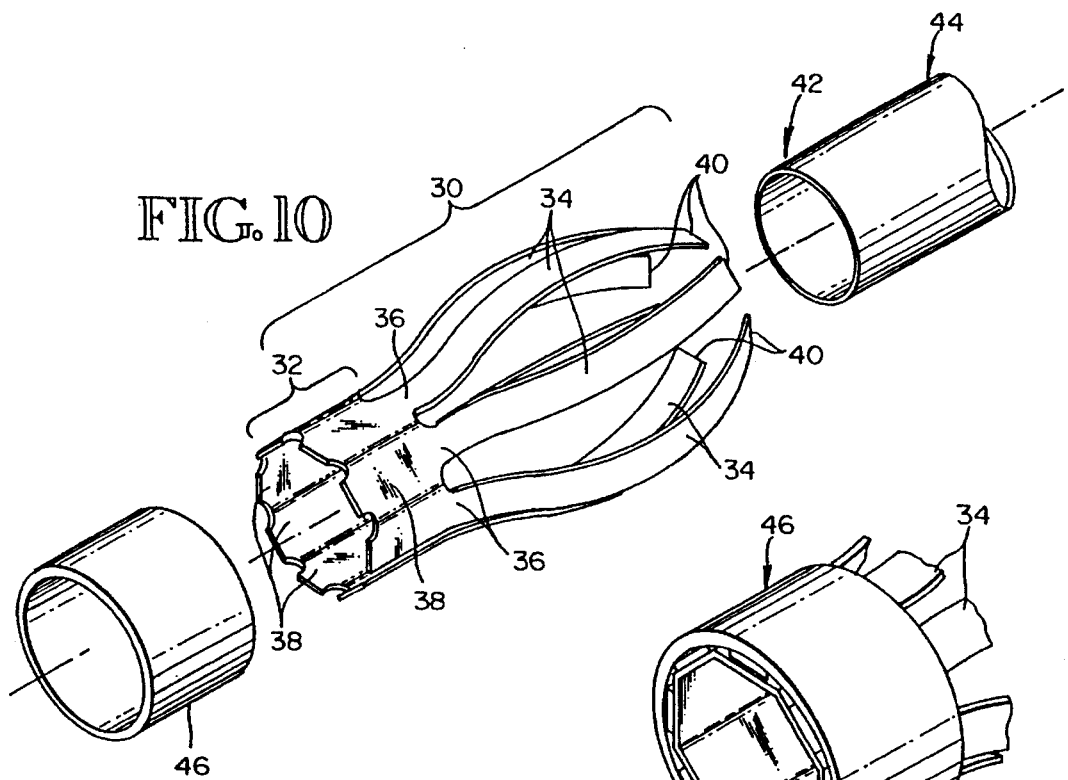
FIG. 10 is an exploded partial view of the present invention.

9. After the folding and creasing has taken place, the rolling key is returned to its resting position, the push pad motive cylinder 113 is energized, pushing the push pad against the blank and advancing it until the first crease strikes the stop 124. When the blank has been advanced to the stop, the push pad motive cylinder relaxes the push pad so that there is no pressure against the blank, the rolling key rotates upward, folding the blank again and creating a second crease in the blank. This process is continued until a closed polygon as shown in FIG. 10 is created. Once the upper body has been formed into a closed polygon, a push ejector 128 is energized, which pushes the finished shaft clutch mechanism off of the mandrel. When the push ejector ejects the finished shaft clutch mechanism, the push pad triggers a reset switch (not shown) which causes the push pad motive cylinder to retract the push pad and begins the drop sequence from the feeding mechanism 80 to allow the next blank to be dropped from the stack.

The forming mechanism is adjusted so that when the blank 54 strikes the stop 124, the crease will occur at the gap 68 between the first two adjacent fingers 34 of the blank. Similarly, as the blank is advanced, the stop causes each crease to occur in the upper body 32 at a place corresponding to a gap between two adjacent fingers. One reason for relaxing the push pad is to allow more accurate folding of the blank.

The rolling key and mandrel are constructed so that as each crease is formed the upper body is "over bent". In other words, the angle created during the bending process is greater than necessary to compensate for the fact that metal will spring back after being bent. Over bending the upper body compensates for the spring back and allows the desired polygonal shape to be achieved. The angle that the rolling key rotates through is adjustable so that the desired bending can be accomplished.

Figure 12:
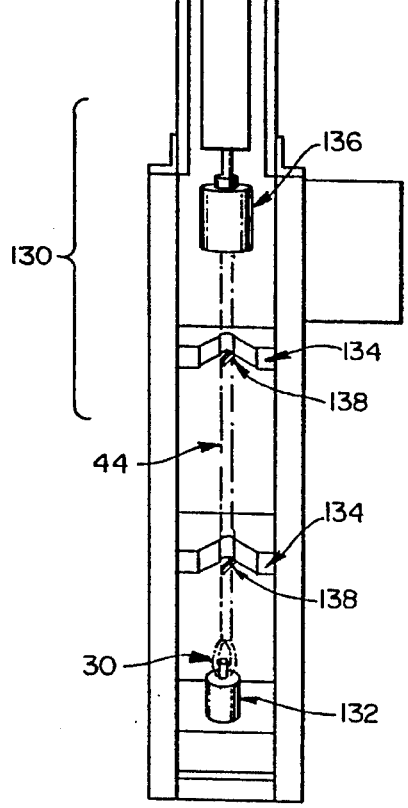
FIG. 12 is a perspective view of a press constructed in accordance with the present invention.

Once the shaft clutch mechanism has been created, a retaining ring 46 is placed around the upper body 32 which is now in the closed polygonal shape. The first end 42 of the inner tube 44 is placed between the fingers 34 of the shaft clutch mechanism and pushed until it abuts against the upper body. At this point, the inner tube first end will not fit inside the shaft clutch mechanism upper body. As shown in FIG. 12 with the inner tube and shaft clutch mechanism in phantom, the shaft clutch mechanism and inner tube are placed in a shaft press 130. The retaining ring and the contained upper body are placed on top of a lower die 132, and the inner tube is pressed into the positioning blocks 134, the upper ram 136 is then energized, pressing down on the inner tube and driving the inner tube first end into the shaft clutch mechanism upper body and retaining ring. With the retaining ring on the outside of the upper body, the inner tube first end into the upper body actually deforms the inner tube first end to emulate the polygonal shape of the shaft clutch mechanism upper body. This ensures that the shaft clutch mechanism will not rotate relative to the inner tube without the use of any extraneous attachments or fixatives, such as welding, adhesives, bolts, rivets, etc. The shaft press in this embodiment uses trigger switches 138 to automatically energize the upper ram when the shaft clutch mechanism and the inner tube are in the proper position. Once the shaft clutch mechanism has been attached to the inner tube the telescoping body can be constructed as shown in FIG. 13.

Pneumatic power is used to energize and drive the various motive cylinders of the bending device, as well as powering the shaft press. While success has been achieved using pneumatic power, other power sources such as hydraulic power, or replacing the motive cylinders with electric motors, can also be quite effective.

Control of the bending device as well as other machines in the production of the shaft clutch mechanism can be achieved in a number of ways. With the embodiments discussed above, success has been achieved using programmable controllers, such as a Westinghouse PC100 to control the two stage press and an Omron C20K to control the bending device. It is believed that other automatic controllers are equally useful in these applications. Use of the programmable controller contained in the control box 140 allows the operation necessary to produce the shaft clutch mechanism to be carried out on a timed, sequenced basis. The increased level of automation vastly increases productivity, and at the same time provides a consistently higher quality product.

While the above discussions described the creation of shaft clutch mechanisms of tubes, such as would be used in a music stand, the above embodiments are equally applicable to any telescoping body with nested elements.

INDUSTRIAL APPLICABILITY

This invention would be useful in any situation where it is desirable to have a simple, effective way of adjusting telescoping bodies with nested elements, and further to have an automated method and apparatus for producing the simple effective adjustment mechanism.

In compliance with the statute, the invention has been described in language more or less specific as to structural features. It is understood, however, that the invention is not limited to the specific features shown, since the means and construction herein disclosed comprise preferred forms of putting the invention to effect.

I claim:

1. A method for producing a shaft clutch component, said method comprising the steps of:

creating a blank from a continuous strip of material, said blank having an upper body and a plurality of fingers separated by intervening gaps and attached to and arrayed along said upper body;

initially bending said upper body of said blank at a first gap between two adjacent fingers to form a crease in said upper body;

further, iteratively bending said upper body at one or more remaining gaps until said upper body has a cross section having a substantially closed polygonal shape; and swaging said upper body against a polygonal mandrel during the initial bending and further, iterative bending steps, to create obtusely angled creases at each said gap to form said substantially closed polygonal shape, said polygonal mandrel having two flat sections defining an obtusely angled bending edge between the flat sections.

2. A method for producing a shaft clutch component, said method comprising the steps of:

creating a blank from a continuous strip of material, said blank having an upper body and a plurality of fingers separated by intervening gaps and attached to and arrayed along said upper body;

initially bending said upper body of said blank at a first gap between two adjacent fingers to form a crease in said upper body;

further, iteratively bending said upper body at one or more remaining gaps until said upper body has a cross section having a substantially closed polygonal shape; and driving one end of an inner tube of a telescoping body, into said upper body, after a retaining ring has been placed around said upper body and said upper body has been bent into said substantially closed polygonal shape, so as to deform said end of said inner tube to emulate said polygonal shape.

3. A method for producing a shaft clutch component comprising the steps of:

creating a blank having an upper body and a plurality of elongated, curved fingers separated by intervening gaps and attached to and arrayed along said upper body;

initially bending said upper body of said blank at a first gap between two adjacent fingers to form a first crease in said upper body;

further, iteratively bending said upper body at one or more remaining gaps using sequential bending operations to iteratively form a crease at each of said gaps during each of said iterative bending operations until said upper body has a cross section having a substantially closed polygonal shape; and swaging said upper body during said initial bending and further, iterative bending steps against a polygonal mandrel having two flat sections defining an obtusely angled bending edge between the flat sections, to iteratively create an obtusely angled crease at each of said gaps to form said upper body polygonal shape.

4. A method for producing a shaft clutch component comprising the steps of:

creating a blank having an upper body and a plurality of elongated, curved fingers separated by intervening gaps and attached to and arrayed along said upper body;

initially bending said upper body of said blank at a first gap between two adjacent fingers to form a first crease in said upper body;

further, iteratively bending said upper body at one or more remaining gaps using sequential bending operations to iteratively form a crease at each of said gaps during each of said iterative bending operations until said upper body has a cross section having a substantially closed polygonal shape;

incrementally advancing a position of said blank approximately one finger width per increment relative to a mandrel bending edge, between the initial bending and further, iterative bending steps, said mandrel bending edge defined by two flat bending sections of the mandrel;

bending said upper body toward a flat bending section of a polygonal mandrel during said initial bending and further, iterative bending steps, by motivating a rolling key from a resting toward a raised position relative to said bending section, and wherein incremental, positional advancement of said blank is controlled coordinately with motivation of said rolling key; and operatively interconnecting said coordinately controlled blank advancement and rolling key motivation to a stop mechanism designed to functionally interact with an advancing crease of said upper body.

5. A method for producing a shaft clutch component comprising the steps of:

creating a blank having an upper body and a plurality of elongated, curved fingers separated by intervening gaps and attached to and arrayed along said upper body;

initially bending said upper body of said blank at a first gap between two adjacent fingers by swaging the upper body against a flat bending section of a polygonal mandrel using a rolling key operable between raised and resting positions relative to said bending section and having a rolling key axis substantially parallel to a longitudinal axis of said mandrel, to form a first crease in said upper body, wherein said upper body is bent toward said flat bending section by motivating said rolling key from said resting position toward said raised position;

further, iteratively bending said upper body at one or more remaining gaps using sequential bending operations to iteratively form a crease at each of said gaps during each of said bending operations until said upper body has a cross section having a substantially closed polygonal shape; and between said initial and further, iterative bending steps, incrementally advancing a position of said blank approximately one finger width per increment relative to a mandrel bending edge defined by two flat sections of said mandrel, wherein incremental, positional advancement of said blank is controlled coordinately with said rolling key motivation, and wherein said coordinately controlled blank advancement and rolling key motivation is operatively interconnected to a stop mechanism designed to functionally interact with an advancing crease of said upper body.

* * * * *